US010574517B2

(12) United States Patent
Curtis et al.

(10) Patent No.: US 10,574,517 B2
(45) Date of Patent: Feb. 25, 2020

(54) ADDING VOICE COMMANDS TO INVOKE WEB SERVICES

(71) Applicant: INTERNATIONAL BUSINESS MACHINES CORPORATION, Armonk, NY (US)

(72) Inventors: Bryce A. Curtis, Round Rock, TX (US); Abraham G. Guerra, Brewster, NY (US); Stewart Nickolas, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 298 days.

(21) Appl. No.: 15/495,138

(22) Filed: Apr. 24, 2017

(65) Prior Publication Data

US 2018/0309645 A1 Oct. 25, 2018

(51) Int. Cl.
*H04L 12/24* (2006.01)
*H04L 29/08* (2006.01)
(Continued)

(52) U.S. Cl.
CPC .......... *H04L 41/0806* (2013.01); *G06F 3/167* (2013.01); *G06F 17/2765* (2013.01);
(Continued)

(58) Field of Classification Search
CPC . H04L 41/0806; H04L 41/0886; H04L 67/02; H04L 67/16; H04L 41/5006; G06F 3/167; G06F 17/2765; G06F 17/2795
(Continued)

(56) References Cited

U.S. PATENT DOCUMENTS 7,089,559 B2 8/2006 Redpath
7,136,895 B2 11/2006 St Pierre et al.
(Continued)

FOREIGN PATENT DOCUMENTS

CN 101916266 12/2010
CN 102629246 8/2012
(Continued)

OTHER PUBLICATIONS

Anonymous et al., "Providing Help as a Service Using a Natural Language Question Answer System", IP.com, Aug. 26, 2014, 5 pages.
(Continued)

*Primary Examiner* — Joseph L Greene
(74) *Attorney, Agent, or Firm* — Brian Restauro; Andrew D. Wright; Roberts Mlotkowski Safran Cole & Calderon, P.C.

(57) ABSTRACT

A computer-implemented method includes: receiving a web service definition file that identifies multiple web services; parsing the web service definition file; identifying respective voice commands to associate with each of the multiple web service based on the parsing; generating a skillset utterances file that maps the respective voice commands to the multiple web services; generating a skillset implementation file that maps the multiple web services to a respective set of instructions, wherein each of the respective set of instructions is used to invoke a corresponding web service; receiving an input voice command from a user via a user device; identifying a particular web service, of the multiple web services, associated with the input voice command based on information included in the skillset utterances file; and invoking the particular web service in accordance with the set of instructions associated with the particular web service included in the skillset implementation file.

20 Claims, 10 Drawing Sheets

(51) Int. Cl.
 *G06F 17/27* (2006.01)
 *G06F 3/16* (2006.01)
(52) U.S. Cl.
 CPC ...... *G06F 17/2795* (2013.01); *H04L 41/0886* (2013.01); *H04L 67/02* (2013.01); *H04L 67/16* (2013.01); *H04L 41/5006* (2013.01)
(58) Field of Classification Search
 USPC ........................................................ 709/222
 See application file for complete search history.

(56) References Cited

U.S. PATENT DOCUMENTS

| | | | |
|---|---|---|---|
| 7,350,192 B2 | 3/2008 | Seitz et al. | |
| 8,718,242 B2 | 5/2014 | Bangalore et al. | |
| 9,245,525 B2 | 1/2016 | Yeracaris et al. | |
| 2005/0166180 A1* | 7/2005 | Lemon | G06F 8/34 |
| | | | 717/106 |
| 2007/0116224 A1 | 5/2007 | Burke et al. | |
| 2010/0185648 A1* | 7/2010 | Chauhan | G06F 3/167 |
| | | | 707/769 |
| 2014/0096004 A1* | 4/2014 | Zhou | G06F 16/957 |
| | | | 715/728 |
| 2015/0143355 A1* | 5/2015 | Tingstrom | G06F 8/65 |
| | | | 717/170 |
| 2015/0269130 A1* | 9/2015 | Huber | G06F 9/451 |
| | | | 715/234 |
| 2015/0277846 A1 | 10/2015 | Yen et al. | |
| 2016/0078866 A1 | 3/2016 | Gelfenbeyn et al. | |

FOREIGN PATENT DOCUMENTS

| | | |
|---|---|---|
| CN | 103377212 | 10/2013 |
| CN | 106164904 | 11/2016 |

OTHER PUBLICATIONS

IBM et al., "Method and Apparatus for Providing Interactive Support in Natural Language", IP.com, Mar. 16, 2009, 4 pages.
Anonymous, "Two-Way Voice Recognition Instant Messenger (VRIM) with Network Voice Conversion Flexibility", IP.com, Sony Corporation; Sony Electronics Inc., Apr. 1, 2004, 10 pages.
Mell et al., "The NIST Definition of Cloud Computing", NIST, Special Publication 800-145, Sep. 2011, 7 pages.
International Search Report and Written Opinion dated Mar. 28, 2018 in corresponding international application; PCT/IB2017/058100, 9 pages.

* cited by examiner

ADDING VOICE COMMANDS TO INVOKE WEB SERVICES

BACKGROUND

The present invention generally relates to adding speech-enabled functionality to an application and, more particularly, to streaming the coding process for adding speech-enabled functionality by auto-generating natural language interfaces to invoke web services.

Adding functionality to a speech-enabled application can be complex, labor intensive, and time consuming. The addition of a speech-enabled function requires the completion of a number of various integration jobs. For example, adding a speech-enabled function requires code to perform a task associated with the function (i.e. order pizza, read emails, search for news, etc.). Also, an additional function in a speech-enabled application requires a list of natural language commands that should be associated with that particular function (i.e., "I'd like to order pizza", "I'm craving pizza", "read emails", etc.). Finally, each additional function requires code to manage each interaction.

In other words, adding new functionality to a speech-enabled application requires: defining the natural language commands that will be associated with the function; implementing code that will parse that command and route the request to an appropriate handler; implementing code to handle the request; and implementing code that will respond to the user. Web services that provide a desired function may be leveraged to implement code to handle a request, however, using web services requires a developer to learn about a web service, and integrating the web service into a speech-enabled application so that the speech-enabled application conforms to the web service requirements. Conforming to the web service can be complicated given that web services accept a variety of inputs, produce a variety of outputs, and may chain multiple web service endpoints in the process of providing a service. As a result, adding functionality to a speech-enabled application can be complicated further when the functionality is based on a third party web service. In short, adding functionality to a speech-enabled application requires significant knowledge and coding. For example, adding functionality to a speech-enabled application requires manually reading web service definitions and writing code, which is time consuming, tedious, and inefficient.

Furthermore, such solutions require a developer to account for dependencies between web services, which can be convoluted and complex to determine, track, and incorporate into code. For example, a web service may depend on obtaining user authentication information, thus requiring the code to first obtain the user authentication information. Since many web services include such dependencies, the developer must incorporate these dependencies in the underlying code in order for the web service to function properly.

SUMMARY

In an aspect of the invention, a computer-implemented method includes receiving, by a computing device, a web service definition file that identifies a plurality of web services; parsing, by the computing device, the web service definition file; identifying, by the computing device, respective voice commands to associate with each of the plurality of web service based on the parsing; generating, by the computing device, a skillset utterances file that maps the respective voice commands to the plurality of web services; generating, by the computing device, a skillset implementation file that maps the plurality of web services to a respective set of instructions, wherein each of the respective set of instructions is used to invoke a corresponding web service; receiving, by the computing device, an input voice command from a user via a user device; identifying, by the computing device, a particular web service, of the plurality of web services, associated with the input voice command based on information included in the skillset utterances file; and invoking, by the computing device, the particular web service in accordance with the set of instructions associated with the particular web service included in the skillset implementation file. Advantageously, aspects of the present invention may dynamically add functionality to speech-enabled applications using web service definition files. Aspects of the present invention may further identify dependencies between the plurality of web services, wherein the skillset implementation file identifies the dependencies between the plurality of web services and includes instructions to invoke a dependent web service when a higher level web service is invoked. Advantageously, significant amounts of man-hours are saved from otherwise requiring developers to manually examine web service definition files, map out dependencies, develop code mapping voice commands to functions/actions, associating the functions/actions to a particular web service, incorporating the dependencies to the code, and incorporating the code into a speech-enabled application.

In an aspect of the invention, there is a computer program product for incorporating new voice commands to invoke web services. The computer program product comprises a computer readable storage medium having program instructions embodied therewith, the program instructions executable by a computing device to cause the computing device to: receive a web service definition file that identifies a plurality of web services; parse the web service definition file; generate a skillset utterances file that maps the respective voice commands to the plurality of web services; generate a skillset implementation file that maps the plurality of web services to a respective set of instructions, wherein each of the respective set of instructions is used to invoke a corresponding web service; receive an update to the web service definition file that identifies additional web services or updates to the plurality of web services; update the skillset utterances file based on receiving the update to the web service definition file; update the skillset implementations file based on receiving the update to the web service definition file; receive an input voice command from a user via a user device; identify a particular web service, of the plurality of web services, associated with the input voice command based on information included in the updated skillset utterances file; and invoke the particular web service in accordance with the set of instructions associated with the particular web service included in the updated skillset implementation file receive periodic updates to a web service definition file that identifies a plurality of web services; maintain, based on receiving periodic updates to the web service definition file, an up to date skillset utterances file that maps the respective voice commands to the plurality of web services; maintain, based on receiving periodic updates to the web service definition file, a skillset implementation file that maps the plurality of web services to a respective set of instructions, wherein each of the respective set of instructions is used to invoke a corresponding web service; receive an input voice command from a user via a user device; identify a particular web service, of the plurality of web services, associated with the input voice command based on information included in the skillset utterances file; and invoke the particular web service in accordance with a set of instructions associated with the particular web service included in the skillset implementation file. Advantageously, aspects of the present invention may dynamically add functionality to speech-enabled applications using web service definition files. Aspects of the present invention may further identify dependencies between the plurality of web services, wherein the skillset implementation file identifies the dependencies between the plurality of web services and includes instructions to invoke a dependent web service when a higher level web service is invoked. Advantageously, significant amounts of man-hours are saved from otherwise requiring developers to manually examine web service definition files, map out dependencies, develop code mapping voice commands to functions/actions, associating the functions/actions to a particular web service, incorporating the dependencies to the code, and incorporating the code into a speech-enabled application.

In an aspect of the invention, a system includes: a CPU, a computer readable memory and a computer readable storage medium associated with a computing device; program instructions to receive a web service definition file that identifies a plurality of web services; program instructions to generate a skillset implementation file that maps the plurality of web services to a respective set of instructions, wherein each of the respective set of instructions is used to invoke a corresponding web service; program instructions to receive an input voice command from a user; program instructions to identify a particular web service, of the plurality of web services, associated with the input voice command; and program instructions to invoke the particular web service in accordance with a set of instructions associated with the particular web service included in the skillset implementation file. The program instructions are stored on the computer readable storage medium for execution by the CPU via the computer readable memory. Advantageously, aspects of the present invention may dynamically add functionality to speech-enabled applications using web service definition files. Aspects of the present invention may further identify dependencies between the plurality of web services, wherein the skillset implementation file identifies the dependencies between the plurality of web services and includes instructions to invoke a dependent web service when a higher level web service is invoked. Advantageously, significant amounts of man-hours are saved from otherwise requiring developers to manually examine web service definition files, map out dependencies, develop code mapping voice commands to functions/actions, associating the functions/actions to a particular web service, incorporating the dependencies to the code, and incorporating the code into a speech-enabled application.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
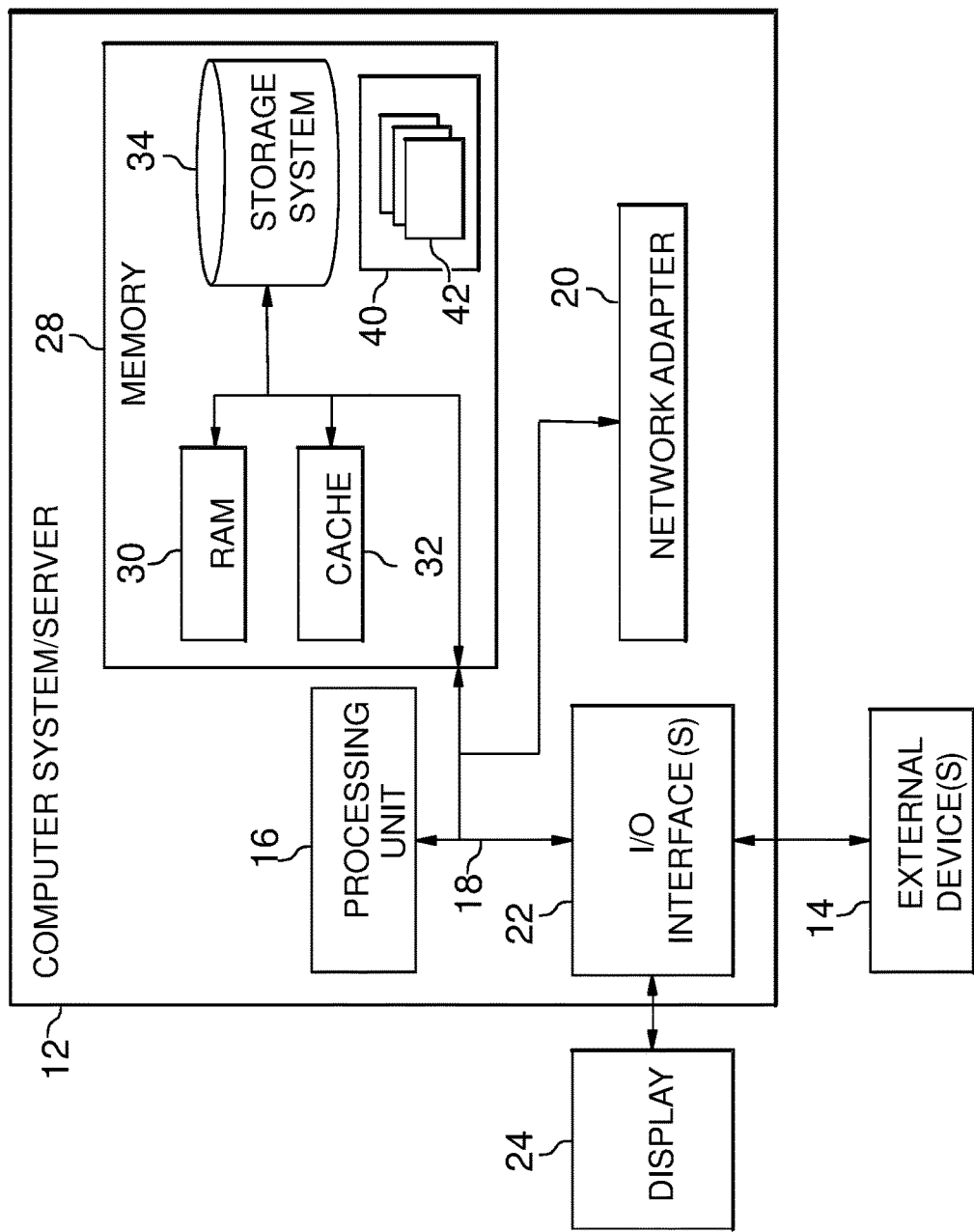
FIG. 1 depicts a cloud computing node according to an embodiment of the present invention.

The present invention generally relates to adding speech-enabled functionality to an application and, more particularly, to streaming the coding process for adding speech-enabled functionality by auto-generating natural language interfaces to invoke web services. Aspects of the present invention may dynamically add functionality to speech-enabled applications using web service definition files. As described herein, a speech-enabled application may include an application that responds to a voice command by performing certain functions and/or actions. As described herein, web service definition files are typically used to define a web service provided by an application or web server, functions/actions corresponding to the service, and endpoints with which to communicate in connection with providing the service or performing the action. As an illustrative example, a web service definition file may define functions for facilitating a transaction (e.g., ordering of food or other products) and endpoints (e.g., application servers, web servers, websites, etc.) with which to access/communicate in connection with facilitating the transaction. The web service definition file may also identify dependencies required to perform a function (e.g., the ordering of a product may be dependent on obtaining customer and/or payment information).

In embodiments, web service definition files may be structured in the form of Swagger JavaScript Object Notation (JSON) files, Swagger YAML files, Extensible Markup Language (XML) files, and/or other types of files. The web service definition files may be analyzed and parsed, and the parsed data may be used to auto-generate a collection of resources that may permit a speech-enabled application to map spoken commands to web services. As described herein, the resources may include service client implementations, natural language commands associated with a web service, and integration code to map spoken commands to service requests. In other words, aspects of the present invention may automatically analyze and parse web service definition files to determine natural language phrases/spoken commands that should be mapped to the invoking of a function or web service. As an illustrative non-limiting example, a web service definition file may be automatically parsed, analyzed, and processed with natural language processing to determine that the spoken command "Order Pizza" should be mapped to invoking a web services function that facilitates a transaction for purchasing pizza.

Since web service definition files are typically developed and produced by web service providers for defining web services provided by the web services provider, aspects of the present invention may leverage existing information to automatically produce and incorporate the necessary coding for implementing additional speech-enabled functions into a speech-enabled application. Further, aspects of the present invention may produce code that accounts for dependencies between different web services such that functions and actions operate properly. Advantageously, significant amounts of man-hours are saved from otherwise requiring developers to manually examine web service definition files, map out dependencies, develop code mapping voice commands to functions/actions, associating the functions/actions to a particular web service, incorporating the dependencies to the code, and incorporating the code into a speech-enabled application. Also, updates to the web service definition files may be periodically received such that new and additional functions defined in the update web service definition files can be incorporated into a speech-enabled application. In other words, aspects of the present invention may dynamically add new voice commands that may be recognized and responded to by a speech-enabled application as updates to the web services file are received.

As described herein, aspects of the present invention may provide a technical solution to the technical problem of adding functions to a speech-enabled application. For example, aspects of the present invention may analyze and parse web service definition files using natural language techniques to identify services/functions associated with different web services hosted by application and web servers. Aspects of the present invention may further produce various computer files (e.g., skillset files) that include instructions and/or code that implement the addition of recognizable voice commands with which a speech-enabled application may respond. In embodiments, aspects of the present invention may provide a technical solution to the technical problem of reducing the labor required to add recognizable voice commands with which a speech-enabled application may respond. For example, aspects of the present invention may incorporate the use of templates to generate skillset files from parsed web service definition files. Aspects of the present invention may analyze potentially thousands of web service definition files in a relatively short period of time in a manner that would not be possible by a human using pen and paper. Further, aspects of the present invention may improve overall speech-recognition technology by creating and incorporating skillset utterance and skillset implementation files that result in speech-enabled applications responding to and executing tasks based on new voice commands. In other words, aspects of the present invention improve overall speech-recognition technology by increasing the number of voice commands recognizable and interpretable by speech-enabled applications.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
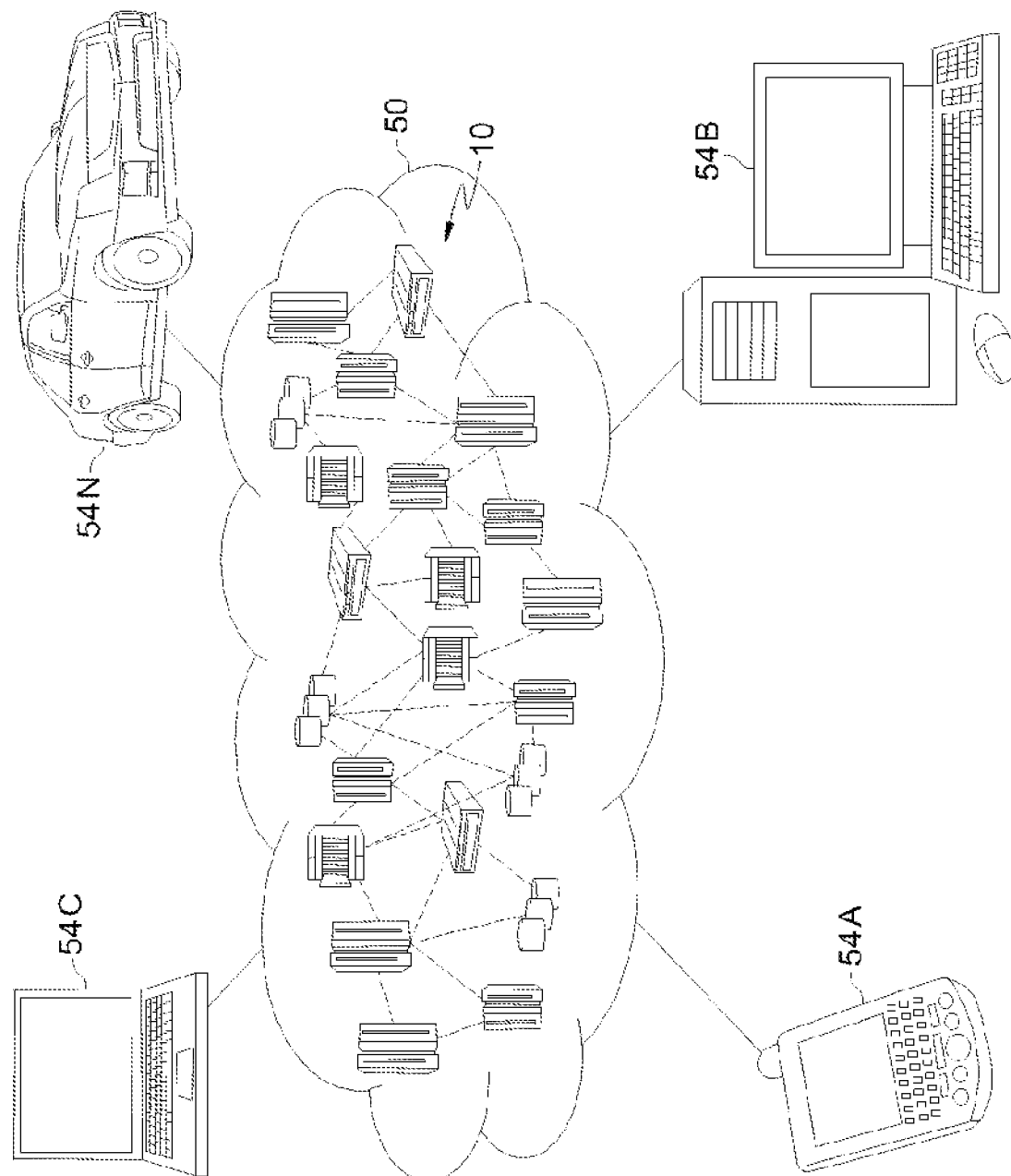
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
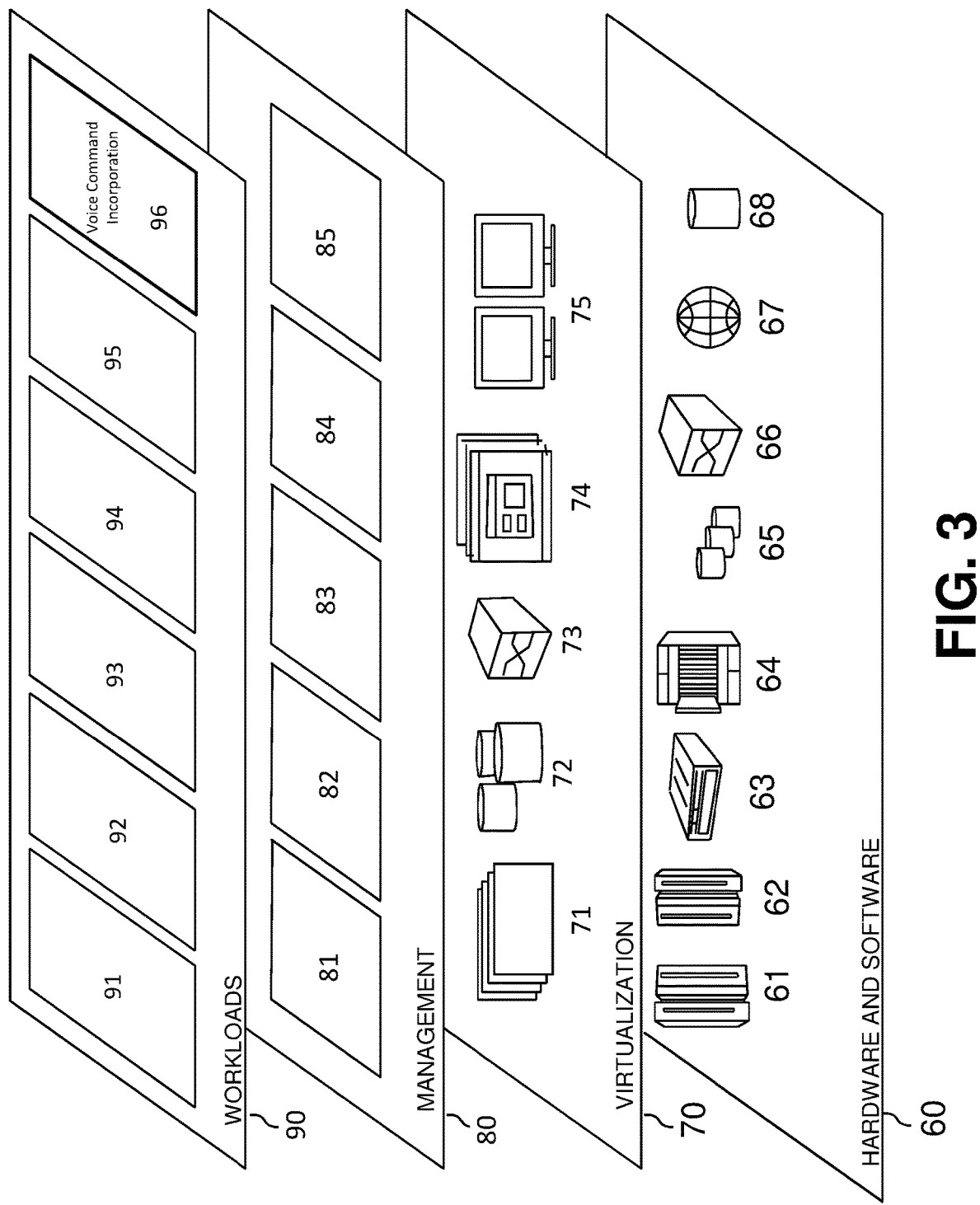
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and voice command incorporation 96.

Referring back to FIG. 1, the program/utility 40 may include one or more program modules 42 that generally carry out the functions and/or methodologies of embodiments of the invention as described herein (e.g., such as the functionality provided by voice command incorporation 96). Specifically, the program modules 42 may receive a web services file, parse the web services file using natural language processing, identifying voice commands associated with web services based on the parsed web services file, identifying dependencies to each service, generate an utterances file that maps a natural language phrase to web services, and generates a skillset implementation file having code that links natural language voice commands to web services. Other functionalities of the program modules 42 are described further herein such that the program modules 42 are not limited to the functions described above. Moreover, it is noted that some of the modules 42 can be implemented within the infrastructure shown in FIGS. 1-3. For example, the modules 42 may be representative of a voice command incorporation server 215 as shown in FIG. 4A.

Figure 4A:
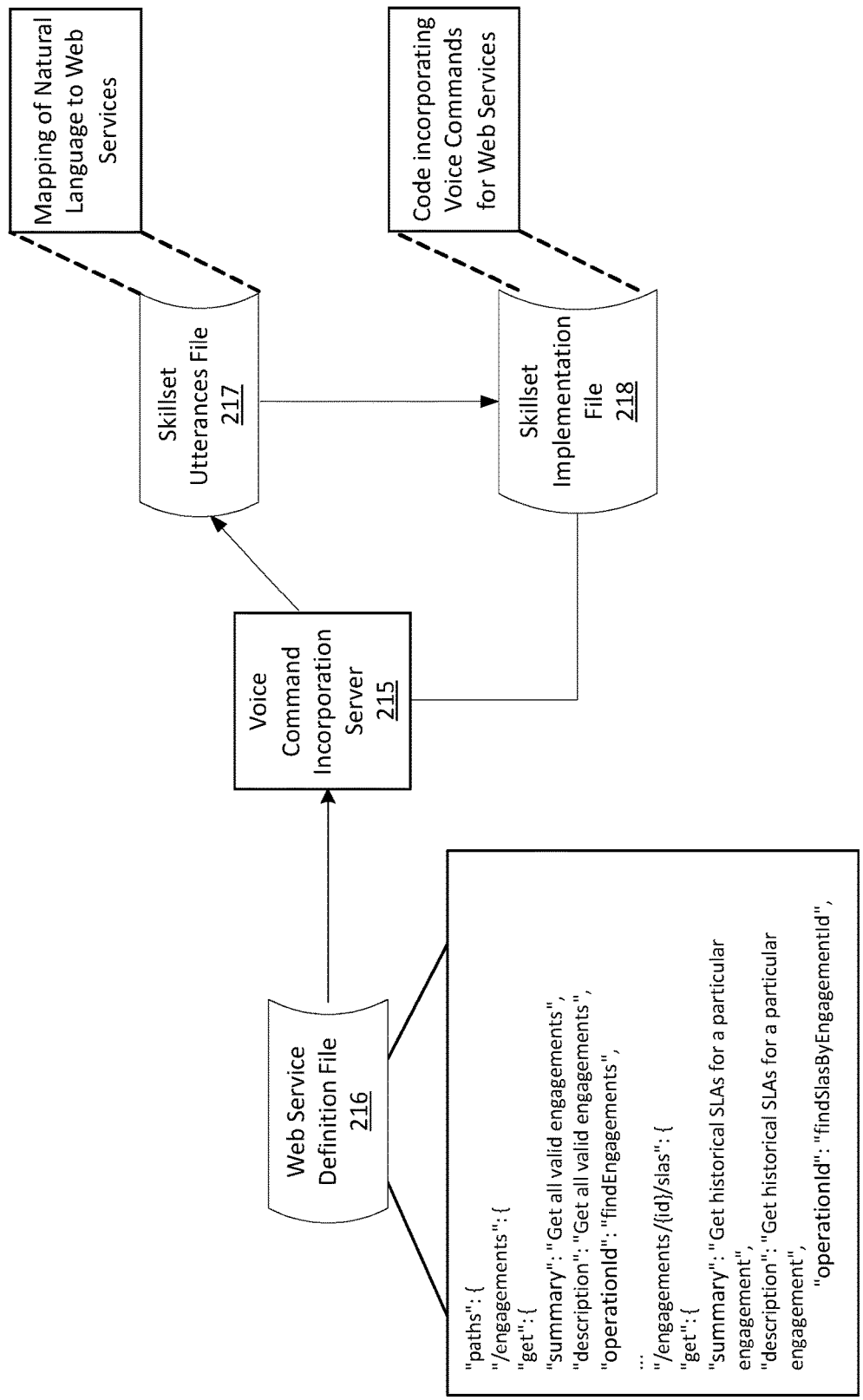
FIGS. 4A and 4B show an overview of an example implementation in accordance with aspects of the present invention
Figure 4B:
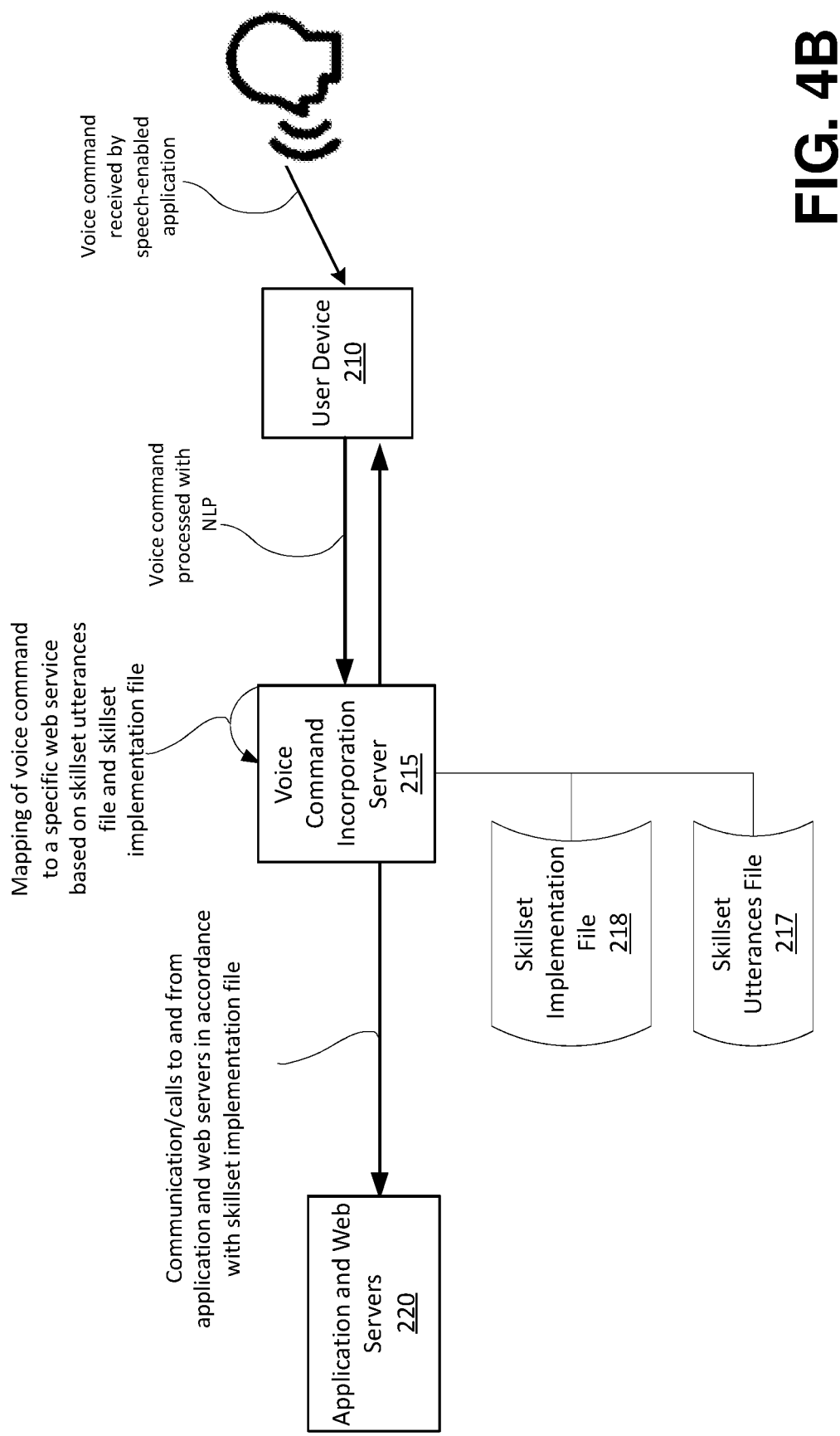

FIGS. 4A and 4B show an overview of an example implementation in accordance with aspects of the present invention. As shown in FIG. 4A, a voice command incorporation server 215 may receive a web service definition file 216 that defines web services provided by a service provider via an application or web server (shown in FIG. 4B as application and web servers 220). In embodiments, the web service definition file 216 may be structured in the form of an XML data structure, a JSON data structure, and/or other formatted structure. In the example shown in FIG. 4A, the web service definition file 216 may be a JSON file that defines web services relating to obtaining service level agreement (SLA) information for engagements. As described herein, the web service definition file 216 may define web services provided by a service provider (e.g., via application and web servers 220 of FIG. 4B), functions/actions corresponding to the service, and endpoints with which to communicate in connection with providing the service or performing the function or action. As shown in FIG. 4A, the web service definition file 216 may identify a summary of a function, a description of the function, and an operation identifier corresponding to the function (e.g., an identifier that is linked to an action or operation).

As described herein, the voice command incorporation server 215 may parse the web service definition file 216 and apply natural language processing to the parsed data. In doing so, the voice command incorporation server 215 may identify the defined functions and services identified in the web service definition file 216, and may further determine natural language phrases (e.g., words, sentences, etc.) that correspond to those functions and services. For example, the voice command incorporation server 215 may parse the web service definition file 216 to identify functions from the summary, description, and/or operation identifier defined in the web service definition file 216. Additionally, the voice command incorporation server 215 may apply natural language processing to the information in the web service definition file 216 to identify spoken commands/natural language phrases that, when spoken by a user, should invoke the corresponding function. Accordingly, the voice command incorporation server 215 may generate a skillset utterances file 217 that maps natural language phrases to web services (e.g., the functions and services defined by the web service definition file 216). As described herein, a natural language phrase may include text data identifying phrases/words corresponding to a voice command. Additionally, or alternatively, a natural language phrase may include other characteristics of the voice command, such as intent, tone, etc.

As an illustrative, non-limiting example, the skillset utterances file 217 may map the natural language phrase (or voice command) "show me all valid engagements" to the function "findEngagements." For example, since the summary and description of "get all valid engagements" is linked to the operation of "find engagements" the voice command incorporation server 215 may apply natural language processing to determine natural language phrases that are similar in intent to the summary and description, and link those natural language phrases to the corresponding operation.

In embodiments, the skillset utterances file 217 may identify multiple different natural language phrases that may be mapped to a single command based on applying natural language processing to the web service definition file 216. In embodiments, the natural language phrases may simply match words and phrases included in the summary or description of the operation. Additionally, or alternatively, the natural language phrases may include other phrases having synonyms and/or having the same intent has the intent included in the parsed data of the web service definition file 216.

As further shown in FIG. 4A, the voice command incorporation server 215 may generate a skillset implementations file 218. In embodiments, the skillset implementations file 218 may include the code that incorporates voice commands (e.g., natural language phrases) to web services based on the mapping included in the skillset utterances file 217. More specifically, the skillset implementations file 218 includes the code, instructions, and/or other information for the voice command incorporation server 215 to process a voice command, identify the web service/function to invoke based on the voice command, and identify which web service clients, application servers, and/or endpoints with which to communicate to process and respond to the voice command. In other words, the skillset implementation file may map a web service to a set of instructions used to invoke the web service. Accordingly, a natural language command (e.g., a voice command) may be mapped to a web service based on information stored in the skillset utterances file 217, and the invoking of the web service may be achieved based on the information stored by the skillset implementations file 218. As described in further detail herein, the skillset implementations file 218 and/or the skillset utterances file 217 may be generated based on templates with previously known data to improve the accuracy of mapping voice commands to web services.

As described herein, the skillset implementation file may link dependent functions together based on dependency information stored in the web service definition file 216. As such, the skillset implementations file 218 may include code/instructions to generate a chain of requests for executing a function when the function is dependent on a prerequisite function. As an illustrative, non-limiting example, the skillset implementations file 218 may include code/instructions to generate a stack of operations including the operations "findEngagements" followed by "findSlasByEngagement" since the operation "findSlasByEngagement" is dependent on the operation "findEngagements". Thus, when a user makes a request (e.g., via voice command) to execute the operation "findSlasByEngagement," the skillset implementations file 218 would execute the operation "findEngagements" to present the user with a list of engagements, use the list of engagement to select a particular engagement ID, and find the SLA for that engagement.

Referring to FIG. 4B, a user device 210 (e.g., a smartphone, tablet, laptop/desktop computing device, etc.) may receive a voice command via a speech-enabled application running on the user device 210. The user device 210 may process the voice command using natural language processing and/or other techniques to map the audio data from the voice command to text, information indicating intent, tone, etc. The user device 210 may output the processed voice command to the voice command incorporation server 215 (e.g., in which the processed voice command includes text associated the voice command, intent of the command, tone of the command, etc.) The voice command incorporation server 215 may receive the processed voice command (or may receive raw audio data corresponding to the voice command and itself process the voice command), and map the processed voice command to a specific web service (e.g., from the skillset utterances file 217 and/or skillset implementation file). The voice command incorporation server 215 may facilitate communications and calls to and from application and web servers 220 and/or other endpoints as directed by the instructions/code included in the skillset implementation files.

As an illustrative, non-limiting example, the voice command incorporation server 215 may receive the voice command "please show me all valid engagements." The voice command incorporation server 215 may map the voice command to a specific web service based on the information stored by the skillset utterances file 217. For example, the voice command incorporation server 215 may map the voice command to the web service or operation ("findEngagements"). The voice command incorporation server 215 may respond to the voice command accordingly based on the instructions in the skillset implementation file that direct the voice command incorporation server 215 to communicate with particular application and web servers 220 (e.g., via web service clients) to perform an action/function associated with the voice command and with the operation "findEngagments".

As described herein, aspects of the present invention may leverage existing information (e.g., web service definition files 216) to automatically produce and incorporate the necessary coding for implementing additional speech-enabled functions into a speech-enabled application (e.g., by producing skillset implementation files and skillset utterances files 217). Further, the skillset implementation file may account for dependencies between different web services such that functions and actions operate properly. Advantageously, significant amounts of man-hours are saved from otherwise requiring developers to manually examine web service definition files 216, map out dependencies, develop code mapping voice commands to functions/actions, associating the functions/actions to a particular web service, incorporating the dependencies to the code, and incorporating the code into a speech-enabled application. Also, updates to the web service definition files 216 may be periodically received such that new and additional functions defined in the update web service definition files 216 can be incorporated into a speech-enabled application. Further, aspects of the present invention may improve overall speech-recognition technology by creating and incorporating skillset utterance and skillset implementation files that result in speech-enabled applications responding to and executing tasks based on new voice commands. In other words, aspects of the present invention improve overall speech-recognition technology by increasing the number of voice commands recognizable and interpretable by speech-enabled applications. Further, aspects of the present invention may maintain skillset utterance files and skillset implementation files based on receiving periodic updates to the web services definition files.

Figure 5:
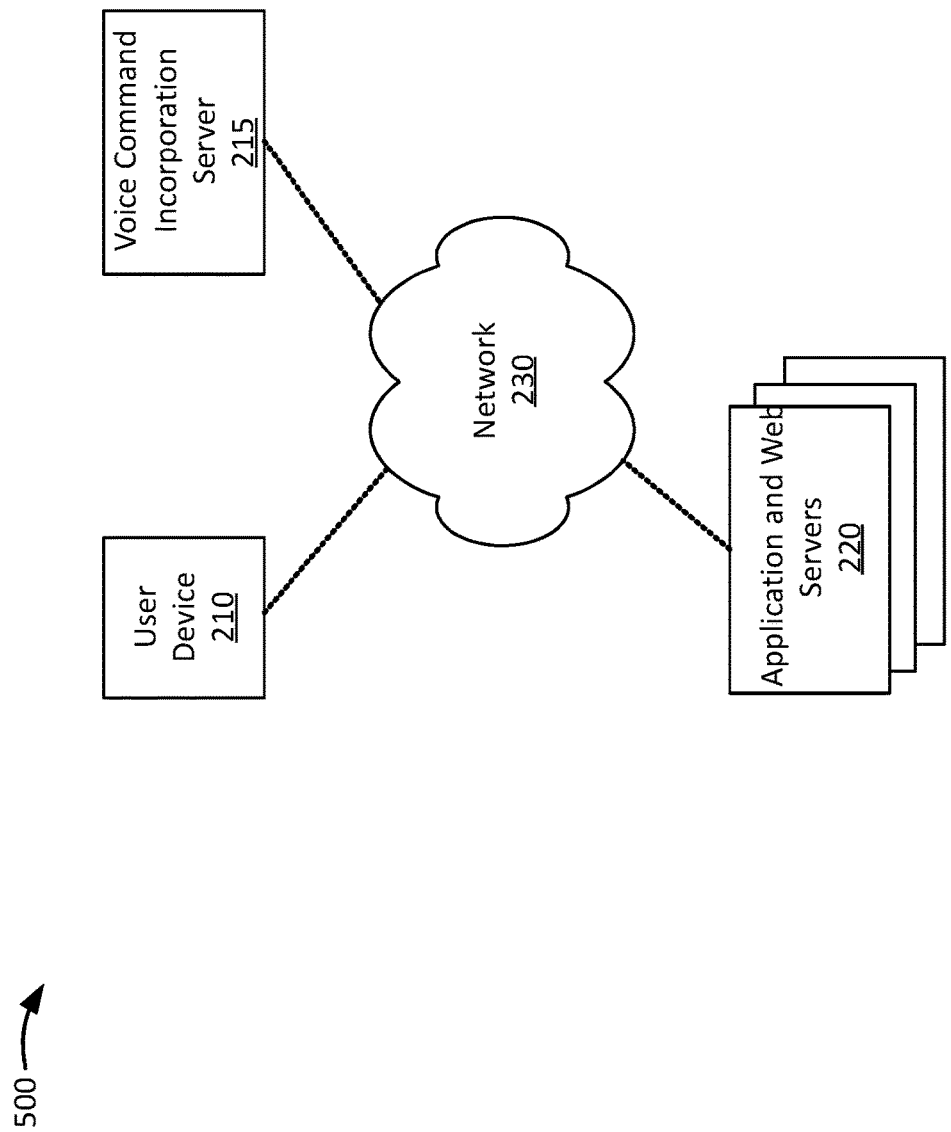
FIG. 5 shows an example environment in accordance with aspects of the present invention.

FIG. 5 shows an example environment in accordance with aspects of the present invention. As shown in FIG. 5, environment 500 may include a user device 210, a voice command incorporation server 215, an application and web servers 220, and a network 230. In embodiments, one or more components in environment 500 may correspond to one or more components in the cloud computing environment of FIG. 2. In embodiments, one or more components in environment 500 may include the components of computer system/server 12 of FIG. 1.

The user device 210 may include a computing device capable of communicating via a network, such as the network 230. For example, the user device 210 may correspond to a mobile communication device (e.g., a smart phone or a personal digital assistant (PDA)), a portable computer device (e.g., a laptop or a tablet computer), a desktop computing device, and/or another type of computing device. In some embodiments, the user device 210 may implement a speech-enabled application for responding to a voice command (e.g., via communication with the voice command incorporation server 215 and/or the application and web servers 220).

The voice command incorporation server 215 may include one or more computing devices (e.g., such as computer system/server 12 of FIG. 1) that receive web service definition files 216, parses, analyzes, and/or processes the web service definition files 216, and generate web service clients that store responses to calls made to web service endpoints (e.g., based on software libraries that identify the responses). As described herein, the voice command incorporation server 215 may implement natural language processing on a web service definition file 216 to identify web services/functions defined by the web service definition file 216, determine natural language phrases/voice commands that should be mapped to the web services, and generate a skillset utterances file 217 that maps the natural language phrases/voice commands to the web services. In embodiments, the voice command incorporation server 215 may generate a skillset implementation file based on the information included in the web service definition file 216. The voice command incorporation server 215 may receive, via a user device 210 a voice command received from a user, and may use the code and instructions in the skillset implementation file to respond to the voice command accordingly (e.g., by communicating with the appropriate endpoints, application and web servers 220, etc. for providing a web service, executing an action, and/or performing a function associated with the voice command).

The application and web servers 220 may include one or more computing devices (e.g., such as computer system/server 12 of FIG. 1) that hosts a web-based application or service that a user device 210 may access. For example, the application and web servers 220 may host e-mail applications, gaming applications, financial applications, news reporting applications, device control/home automation applications, e-commerce applications, etc. A developer of an application and web server 220 may develop a web service definition file 216 to define applications/services hosted and provided by the application and web server 220. As described herein, the voice command incorporation server 215 may receive the web service definition file 216 to automatically implement new voice commands that may be used to perform a task in connection with applications/services provided by the application and web server 220.

The network 230 may include network nodes, such as network node 10 of FIG. 2. Additionally, or alternatively, the network 230 may include one or more wired and/or wireless networks. For example, the network 230 may include a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, the network 230 may include a local area network (LAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks.

The quantity of devices and/or networks in the environment 500 is not limited to what is shown in FIG. 5. In practice, the environment 500 may include additional devices and/or networks; fewer devices and/or networks; different devices and/or networks; or differently arranged devices and/or networks than illustrated in FIG. 5. Also, in some implementations, one or more of the devices of the environment 500 may perform one or more functions described as being performed by another one or more of the devices of the environment 500. Devices of the environment 500 may interconnect via wired connections, wireless connections, or a combination of wired and wireless connections.

Figure 6:
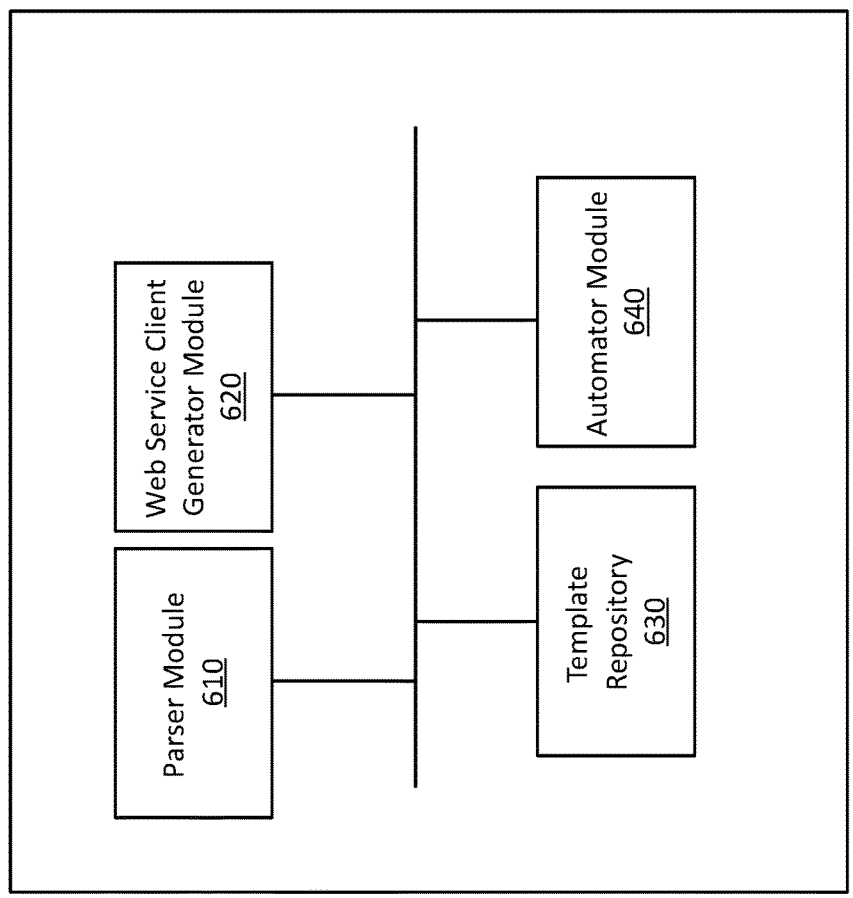
FIG. 6 shows a block diagram of example components of a voice command incorporation server in accordance with aspects of the present invention.

FIG. 6 shows a block diagram of example components of a voice command incorporation server 215 in accordance with aspects of the present invention. As shown in FIG. 6, the voice command incorporation server 215 may include a parser module 610, a web service client generator module 620, a template repository 630, and an automator module 640. In embodiments, the voice command incorporation server 215 may include additional or fewer components than those shown in FIG. 6. In embodiments, separate components may be integrated into a single computing component or module. Additionally, or alternatively, a single component may be implemented as multiple computing components or modules.

The parser module 610 may include a program module (e.g., program module 42 of FIG. 1) that receives and parses web service definition files 216. In embodiments, the parser module 610 may parse the web service definition files 216 using third party libraries and/or a custom built parsing algorithm. The parsed data may be stored and used as inputs by the automator module 640 for generating a skillset utterances file 217 and a skillset implementations file 218. In embodiments, the parsed data may also be used to generate client implementations for calling a web service defined in the web service definition file 216. In embodiments, the parser module 610 may parse the web service definition file 216 using natural language processing to identify web services that may be invoked using a natural language command (e.g., a voice command). The parser module 610 may identify a natural language phrase, keyword, or the like that may be used to invoke a web service. In embodiments, the parsed data may include characteristics of the web service definition file 216 (e.g., service name, service endpoint, service description, etc.).

The web service client generator module 620 may include a program module (e.g., program module 42 of FIG. 1) that may generate a web service client based on parsed data received from the parser module 610. As described herein, the web service client may include an application, code, and/or set of instructions that makes a call to an application and web server 220 in connection with receiving data for a web service hosted by the application and web server 220 (e.g., when the web service is invoked). In embodiments, the web service client generator module 620 may generate the web service client using third party libraries and/or custom code. In embodiments, the web service client may be stored by the voice command incorporation server 215.

The template repository 630 may include a data storage device (e.g., storage system 34 of FIG. 1) that stores templates used by the automator module 640 for creating a skillset utterances file 217 and a skillset implementations file 218. In embodiments, the template may identify a standard set of instructions or code to include in the skillset implementations file 218 based on characteristics of a web service definition file 216 (or characteristics of parsed data extracted from the web service definition file 216). For example, the template may identify that for certain types of web services, the skillset implementation file may include a standard set of instructions or code. As described in greater detail herein, the skillset implementation file may have additional instructions and codes using the standard set from the template as a "starting point." In embodiments, the template may identify a format of the skillset implementations file 218 and/or of the skillset utterances file 217 based on the characteristics of the web service definition file 216.

The automator module 640 may include a program module (e.g., program module 42 of FIG. 1) that may receive parsed data from the parser module 610, and apply the parsed data to a template stored by the template repository 630. The automator module 640 may generate a skillset utterances file 217 from the parsed data and the template. As described herein, the skillset utterances file 217 may map natural language commands to web services. In embodiments, the mapping of natural language commands to web services may be based on the data parsed from the web service definition file 216 (e.g., service name, service endpoint, service description, etc.). As described herein, the skillset utterances file 217 may map intent, tone, and/or other characteristics of a natural language command to a web service.

As described herein, the automator module 640 may also generate a skillset implementations file 218 that is based on the skillset utterances file 217. In embodiments, the skillset implementations file 218 may include code and/or a set of instructions that links a natural language phrase (e.g., a voice command) to a web service (e.g., based on the skillset utterances file 217). Additionally, the skillset implementations file 218 may include code and/or a set of instructions that links the web service to a web service client such that when a web service is invoked (e.g., via a voice command received by the voice command incorporation server 215), the appropriate web service client associated with the particular invoked web service is triggered and makes the appropriate call to a corresponding application and web server 220 in connection with obtaining data relating to the invoked web service.

As described herein, the skillset implementations file 218 may also identify dependencies between web services as identified in the web service definition file 216. For example, the automator module 640 may identify web services that are dependent on data from other web services, and may store information identifying these dependencies in the skillset implementations file 218. As an example, the automator module 640 may identify the text within the web service definition file 216 in which one service makes reference to data from another service (e.g., when an e-mail application makes reference to data from a credential receiving service). Accordingly, the skillset implementations file 218 may include code and/or instructions that may invoke a lower-level dependent web service when a higher-level web service is invoked.

Figure 7:
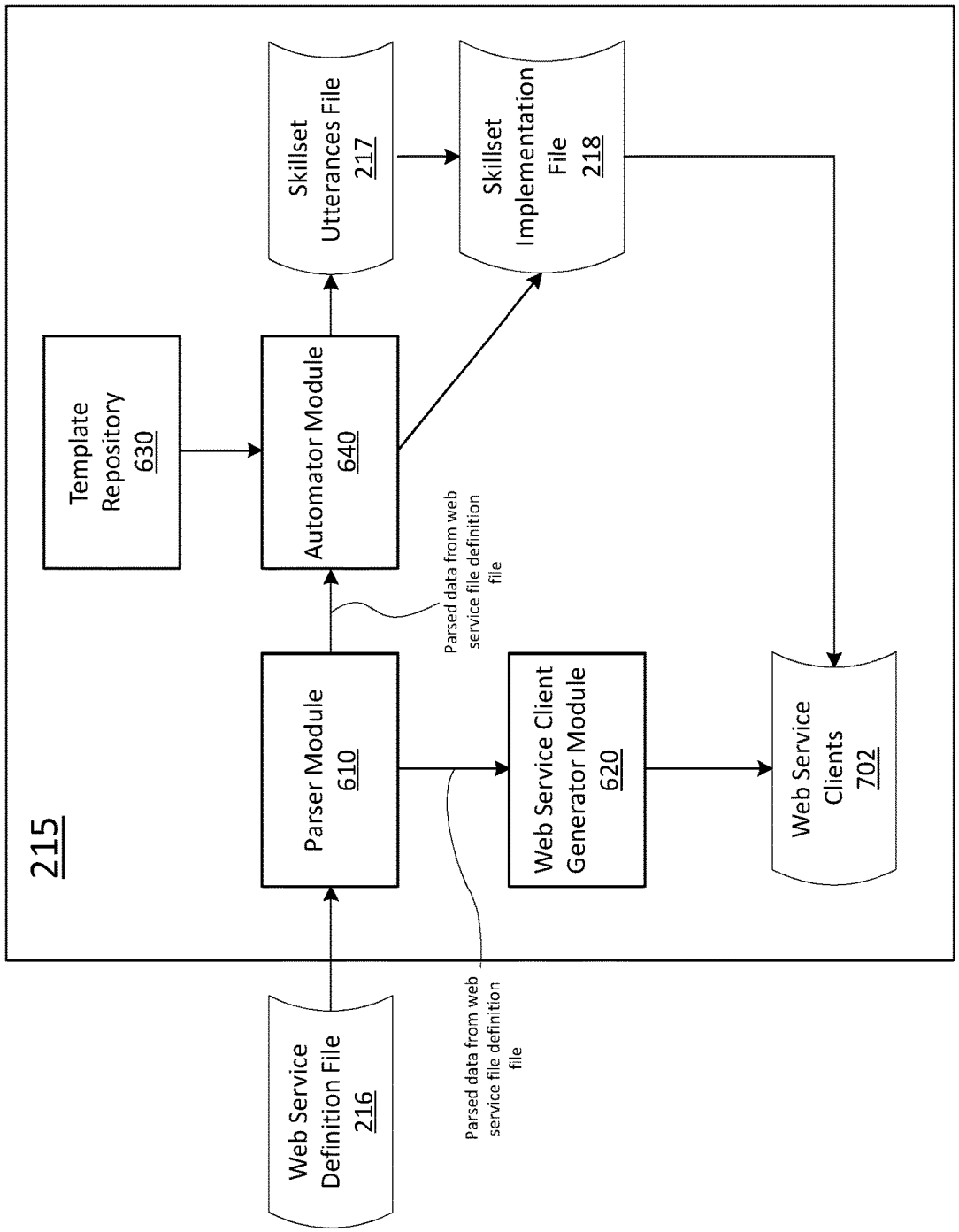
FIG. 7 shows a diagram that illustrates incorporating new voice commands into a speech-enabled application for invoking web services in accordance with aspects of the present invention.

FIG. 7 shows an example diagram that illustrates incorporating new voice commands into a speech-enabled application for invoking web services in accordance with aspects of the present invention. As shown in FIG. 7, the parser module 610 of the voice command incorporation server 215 may receive a web service definition file 216 (e.g., as described above with respect to FIG. 6). The web service client generator module 620 may generate a web service client 702 based on parsed data from the web service definition file 216 and using third party libraries and/or custom code. In embodiments, the web service client 702 may be stored by the voice command incorporation server 215.

As further shown in FIG. 7, the automator module 640 may receive the parsed data from the web service definition file 216 and may also obtain template data from the template repository 630. In embodiments, the automator module 640 may select a particular template based on the characteristics of the web service definition file 216 (as determined from the parsed data). The automator module 640 may apply the parsed data to the template to generate the skillset utterances file 217. In other words, the template populated with the parsed data may correspond to the skillset utterances file 217. In embodiments, the automator module 640 may generate a skillset implementations file 218 that is based on the skillset utterances file 217. As described herein, the skillset implementations file 218 may include code and/or a set of instructions that links a natural language phrase (e.g., a voice command) to a web service (e.g., based on the skillset utterances file 217). As described herein, the voice command incorporation server 215 may use the skillset implementations file 218 to map a received natural language phrase (e.g., voice command) to a corresponding web service and to the code used to invoke the web service (e.g., via the appropriate web service clients 702).

Figure 8:
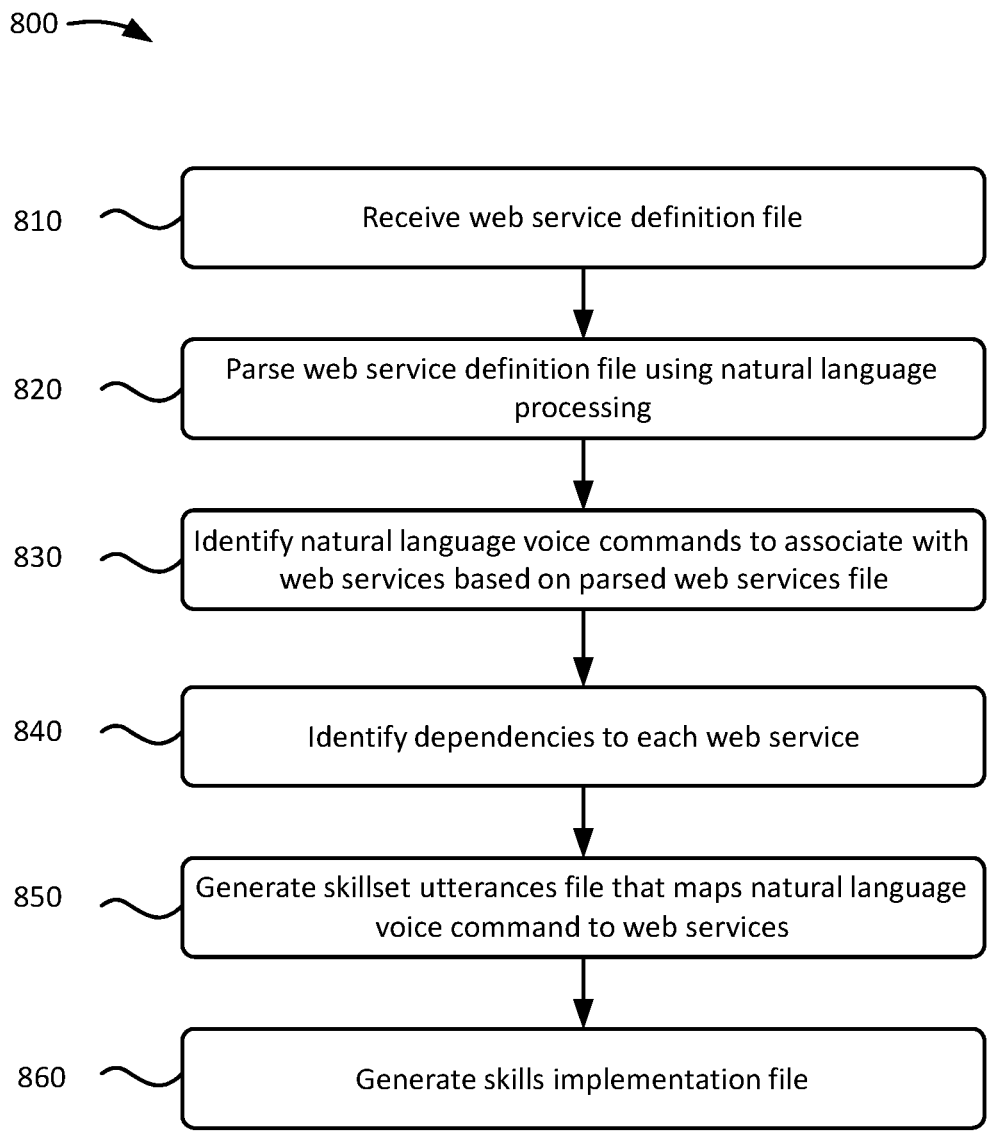
FIG. 8 shows a flowchart of an example process for incorporating new voice commands into a speech-enabled application for invoking web services in accordance with aspects of the present invention.

FIG. 8 shows an example flowchart for incorporating new voice commands into a speech-enabled application for invoking web services in accordance with aspects of the present invention. The steps of FIG. 8 may be implemented in the environment of FIG. 5, for example, and are described using reference numbers of elements depicted in FIG. 5. As noted above, the flowchart illustrates the architecture, functionality, and operation of possible implementations of systems, methods, and computer program products according to various embodiments of the present invention.

As shown in FIG. 8, process 800 may include receiving a web service definition file 216 (step 810). For example, as described above with respect to the parser module 610, the voice command incorporation server 215 may receive a web service definition file 216 (e.g., from a developer or administrator associated with an application and web server 220). In embodiments, the web service definition file 216 may be pushed to the voice command incorporation server 215 periodically or when an update to the web service definition file 216 is released. Additionally, or alternatively, the voice command incorporation server 215 may periodically fetch the web service definition file 216 from the application and web server 220.

Process 800 may also include parsing the web service definition file 216 using natural language processing (step 820). For example, as described above with respect to the parser module 610, the voice command incorporation server 215 may parse the web service definition file 216 using natural language processing to identify web services that may be invoked using a natural language command (e.g., a voice command). In embodiments, the parsed data may include characteristics of the web service definition file 216 (e.g., service name, service endpoint, service description, etc.). In embodiments, the voice command incorporation server 215 may also parse the web service definition files 216 using third party libraries and/or a custom built parsing algorithm.

Process 800 may further include identifying natural language voice commands to associate with web services based on the parsed web service definition file 216 (step 830). For example, as described above with respect to the parser module 610, the voice command incorporation server 215 may identify a natural language phrase, keyword, intent, tone, or the like to associate with web services. In other words, the voice command incorporation server 215 may identify a voice command that may be used to invoke a web service based on the parsing the web service definition file 216 with natural language processing.

Process 800 may also include identifying dependencies to each web service (step 840). For example, as described above with respect to the automator module 640, the voice command incorporation server 215 may identify dependencies to each web service defined in the web service definition file 216. For example, the web service definition file 216 may include information that indicates the dependencies and the voice command incorporation server 215 may identify the dependencies based on the information from the web service definition file 216. As an illustrative example, the automator module 640 may identify the text within the web service definition file 216 in which one service makes reference to data from another service (e.g., when an e-mail application makes reference to data from a credential receiving service).

Process 800 may further include generating a skillset utterances file 217 that maps natural language (step 850). For example, as described above with respect to the 640, the voice command incorporation server 215 may generate a skillset utterances file 217 from the parsed data and a template stored by the template repository 630. As described herein, the skillset utterances file 217 may map natural language commands to web services. In embodiments, the mapping of natural language commands to web services may be based on the data parsed from the web service definition file 216 (e.g., service name, service endpoint, service description, etc.).

Process 800 may also include generating a skillset implementation file (step 860). For example, as described above with respect to the automator module 640, the voice command incorporation server 215 may generate the skillset implementation file generate a based on the skillset utterances file 217. As described herein, the skillset implementations file 218 may include code and/or a set of instructions that links a natural language phrase (e.g., a voice command) to a web service (e.g., based on the skillset utterances file 217). Additionally, the skillset implementations file 218 may include code and/or a set of instructions that links the web service to a web service client such that when a web service is invoked (e.g., via a voice command received by the voice command incorporation server 215), the appropriate web service client associated with the particular invoked web service is triggered and makes the appropriate call to a corresponding application and web server 220 in connection with obtaining data relating to the invoked web service. As described herein, the skillset implementations file 218 may also identify dependencies between web services as identified in the web service definition file 216 and as determined in step 840. As described herein, the skillset implementations file 218 may be stored by the voice command incorporation server 215 and used to identify a web service associated with a received spoken command, and the code for invoking the web service via corresponding web service clients.

As described herein, process 800 may be repeated each time an updated web service definition file 216 is received. In this way, as web service definition files 216 are updated, new voice commands may be incorporated for new web services identified in the updated web service definition files 216. Also, web service clients and/or skillset implementation files may be updated with updated endpoint information that may be identified by updated web service definition files 216. In other words, aspects of the present invention may maintain skillset utterance files and skillset implementation files based on receiving periodic updates to the web services definition files.

Figure 9:
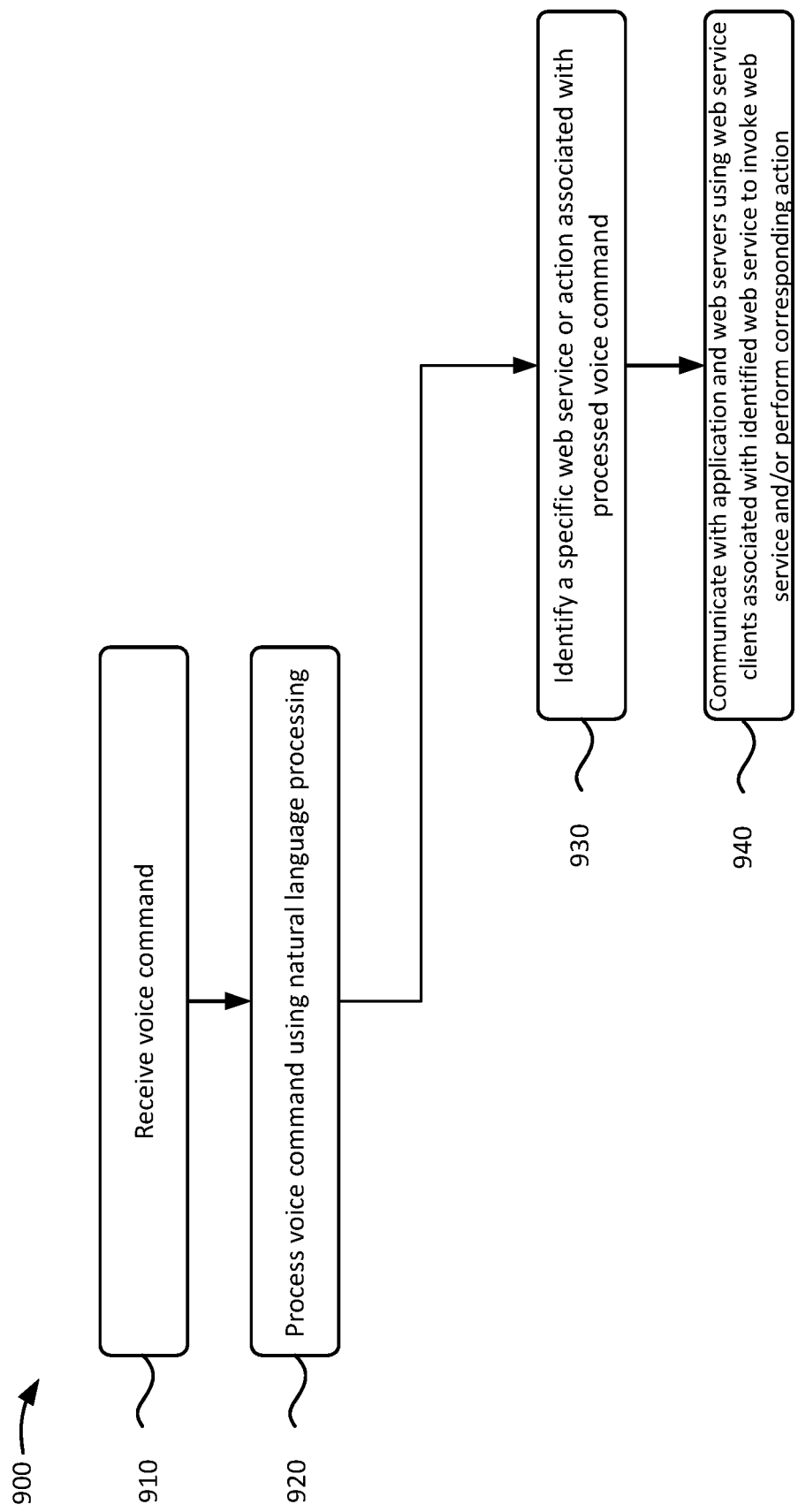
FIG. 9 shows a flowchart of an example process for responding to newly incorporated voice commands for invoking web services in accordance with aspects of the present invention.

FIG. 9 shows an example flowchart for responding to newly incorporated voice commands for invoking web services in accordance with aspects of the present invention. The steps of FIG. 8 may be implemented in the environment of FIG. 5, for example, and are described using reference numbers of elements depicted in FIG. 5. As noted above, the flowchart illustrates the architecture, functionality, and operation of possible implementations of systems, methods, and computer program products according to various embodiments of the present invention.

As shown in FIG. 9, process 900 may include receiving a voice command (step 910). For example, a user device 210 may receive a voice command from a user via a speech-enabled application and voice input hardware (e.g., a microphone).

Process 900 may further include processing the voice command using natural language processing (step 920). For example, the user device 210 may process the voice command with natural language processing to convert the audio from the voice command to text. Additionally, or alternatively, the user device 210 may process the voice command with natural language processing to determine other characteristics of the voice command (e.g., intent, tone, etc.). As described herein, a processed voice command may include text from the voice command, information identifying intent, tone, etc.

Process 900 may also include identifying a specific web service or action associated with processed voice command (step 930). For example, the voice command incorporation server 215 may receive the processed voice command from the user device 210. The voice command incorporation server 215 may map the voice command to a specific web service or action based on the information stored by the skillset utterances file 217.

Process 900 may further include communicating with application and web servers via web service clients associated with the identified web service to invoke the web service and/or perform a corresponding action (step 940). For example, the voice command incorporation server 215 may use the skillset implementations file 218 to identify the application and web servers 220 and/or other endpoints with which to communicate in connection with invoking the web service. The voice command incorporation server 215 may communicate with the application and web servers 220 and/or other endpoints via the corresponding web service clients identified by the skillset implementations file 218 to invoke the web service and/or perform a corresponding action. Data received as part of invoking the web service may be provided back to the user device 210 (e.g., when the web service includes a request for certain data to be presented by the user device 210).

In embodiments, the voice command incorporation server 215 may generate an ordered stack of tasks in the event that an invoked service is dependent on a high-level web service. For example, if the invoked web service was a request to access an e-mail account, the voice command incorporation server 215 may generate an ordered stack of tasks that first presents the user device 210 with a web service that requests login credentials for the e-mail.

As described herein, aspects of the present invention may leverage existing information (e.g., web service definition files 216) to automatically produce and incorporate the necessary coding for implementing additional speech-enabled functions into a speech-enabled application (e.g., by producing skillset implementation files and skillset utterances files 217). Further, the skillset implementation file may account for dependencies between different web services such that functions and actions operate properly. Advantageously, significant amounts of man-hours are saved from otherwise requiring developers to manually examine web service definition files 216, map out dependencies, develop code mapping voice commands to functions/actions, associating the functions/actions to a particular web service, incorporating the dependencies to the code, and incorporating the code into a speech-enabled application. Also, updates to the web service definition files 216 may be periodically received such that new and additional functions defined in the update web service definition files 216 can be incorporated into a speech-enabled application. Further, aspects of the present invention may improve overall speech-recognition technology by creating and incorporating skillset utterance and skillset implementation files that result in speech-enabled applications responding to and executing tasks based on new voice commands. In other words, aspects of the present invention improve overall speech-recognition technology by increasing the number of voice commands recognizable and interpretable by speech-enabled applications.

In embodiments, a service provider could offer to perform the processes described herein. In this case, the service provider can create, maintain, deploy, support, etc., the computer infrastructure that performs the process steps of the invention for one or more customers. These customers may be, for example, any business that uses voice command technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
receiving, by a computing device, a web service definition file that identifies a plurality of web services;
auto-generating, by the computing device, natural language interfaces enabling a user to invoke the plurality of web services of the web service definition file using voice commands, wherein the auto-generating includes:
parsing, by the computing device, the web service definition file;
determining, by the computing device, respective new voice commands to be associated with each of the plurality of web services based on the parsing;
generating, by the computing device based on the determining the respective voice commands, a skillset utterances file that maps the respective new voice commands to the plurality of web services; and
generating, by the computing device, a skillset implementation file that maps the plurality of web services to a respective set of instructions, wherein each of the respective set of instructions is used to invoke a corresponding web service;
receiving, by the computing device, an input voice command from a user via a user device;
identifying, by the computing device, a particular web service, of the plurality of web services, associated with the input voice command based on information included in the skillset utterances file; and
invoking, by the computing device, the particular web service in accordance with a set of instructions associated with the particular web service included in the skillset implementation file.

2. The method of claim 1, further comprising identifying dependencies between the plurality of web services, wherein the skillset implementation file identifies the dependencies between the plurality of web services and includes instructions to invoke a dependent web service when a higher level web service is invoked.

3. The method of claim 1, wherein the web service definition file is received from an application or web server that hosts the plurality of web services.

4. The method of claim 1, wherein the invoking the particular web service includes facilitating communications between the user device and an application or web server that hosts the particular web service.

5. The method of claim 1, wherein the parsing includes parsing the web service definition file with natural language processing.

6. The method of claim 5, wherein each of the respective new voice commands includes at least one selected from the group consisting of:
a natural language phrase;
an intent; and
a tone.

7. The method of claim 1, wherein the input voice command is processed with natural language processing.

8. The method of claim 7, wherein the input voice command is processed with natural language processing by the user device prior to the computing device receiving the input voice command.

9. The method of claim 1, wherein the invoking the particular web service includes invoking the particular web service via a web service client stored by the computing device.

10. The method of claim 1, wherein a service provider at least one of creates, maintains, deploys and supports the computing device.

11. The method of claim 1, wherein the receiving the web service definition file, the parsing the web service definition file, the generating the skillset utterances file, the generating the skillset implementations file, the receiving the input voice command, the identifying the particular web service, and the invoking the particular web service are provided by a service provider on a subscription, advertising, and/or fee basis.

12. The method of claim 1, wherein the computing device includes software provided as a service in a cloud environment.

13. The method of claim 1, further comprising deploying a system for incorporating the new voice commands to invoke web services, comprising providing a computer infrastructure operable to perform the receiving the web service definition file, the parsing the web service definition file, the generating the skillset utterances file, the generating the skillset implementations file, the receiving the input voice command, the identifying the particular web service, and the invoking the particular web service.

14. A computer program product for incorporating new voice commands to invoke web services, the computer program product comprising a computer readable storage medium having program instructions embodied therewith, the program instructions executable by a computing device to cause the computing device to:
receive periodic updates to a web service definition file that identifies a plurality of web services;
auto-generate natural language interfaces enabling a user to invoke the plurality of web services of the web service definition file using voice commands, wherein the auto-generating includes:
determining respective new voice commands to be associated with each of the plurality of web service based on a parsing of the web service definition file;
dynamically maintaining, based on the receiving periodic updates to the web service definition file, an up to date skillset utterances file that maps the respective new voice commands to the plurality of web services; and
dynamically maintaining, based on the receiving periodic updates to the web service definition file, a skillset implementation file that maps the plurality of web services to a respective set of instructions, wherein each of the respective set of instructions is used to invoke a corresponding web service;
receive an input voice command from a user via a user device;
identify a particular web service, of the plurality of web services, associated with the input voice command based on information included in the skillset utterances file; and
invoke the particular web service in accordance with a set of instructions associated with the particular web service included in the skillset implementation file.

15. The computer program product of claim 14, wherein the program instructions further cause the computing device to identify dependencies between the plurality of web services, wherein the skillset implementation file identifies the dependencies between the plurality of web services and includes instructions to invoke a dependent web service when a higher level web service is invoked.

16. The computer program product of claim 14, wherein the invoking the particular web service includes facilitating communications between the user device and an application or web server that hosts the particular web service.

17. The computer program product of claim 14, wherein the parsing includes parsing the web service definition file with natural language processing.

18. The computer program product of claim 14, wherein the invoking the particular web service includes invoking the particular web service via a web service client stored by the computing device.

19. A system comprising:
a CPU, a computer readable memory and a computer readable storage medium associated with a computing device;
program instructions to receive a web service definition file that identifies a plurality of web services;
program instructions to auto-generate natural language interfaces enabling a user to invoke the plurality of web services of the web service definition file using voice commands, wherein the program instructions to auto-generate natural language interfaces includes:
program instructions to parse the web service definition file;
program instructions to determine respective new voice commands to be associated with each of the plurality of web service based on the parsing;
program instructions to generate, based on the determining the respective new voice commands, a skillset utterances file that maps the respective new voice commands to the plurality of web services; and
program instructions to generate a skillset implementation file that maps the plurality of web services to a respective set of instructions, wherein each of the respective set of instructions is used to invoke a corresponding web service;
program instructions to receive an input voice command from a user;
program instructions to identify a particular web service, of the plurality of web services, associated with the input voice command based on the skillset utterances file; and
program instructions to invoke the particular web service in accordance with a set of instructions associated with the particular web service included in the skillset implementation file,
wherein the program instructions are stored on the computer readable storage medium for execution by the CPU via the computer readable memory.

20. The system of claim 19, further comprising program instructions to identify dependencies between the plurality of web services, wherein the skillset implementation file identifies the dependencies between the plurality of web services and includes instructions to invoke a dependent web service when a higher level web service is invoked.

* * * * *